(12) United States Patent
Chu

(10) Patent No.: US 9,350,251 B2
(45) Date of Patent: May 24, 2016

(54) POWER CONVERSION APPARATUS AND OVER POWER PROTECTION METHOD THEREOF

(71) Applicant: Power Forest Technology Corporation, Hsinchu (TW)

(72) Inventor: Kwan-Jen Chu, Hsinchu (TW)

(73) Assignee: Power Forest Technology Corporation, Hsinchu County (TW)

( * ) Notice: Subject to any disclaimer, the term of this patent is extended or adjusted under 35 U.S.C. 154(b) by 133 days.

(21) Appl. No.: 14/493,357

(22) Filed: Sep. 23, 2014

(65) Prior Publication Data

US 2016/0043645 A1    Feb. 11, 2016

(30) Foreign Application Priority Data

Aug. 7, 2014    (TW) .............................. 103127080 A

(51) Int. Cl.
*H02M 3/335*    (2006.01)
*H02M 1/32*    (2007.01)
*H02M 1/00*    (2006.01)

(52) U.S. Cl.
CPC ............ *H02M 3/33507* (2013.01); *H02M 1/32* (2013.01); *H02M 2001/0009* (2013.01)

(58) Field of Classification Search
CPC ..................... H02M 3/33507; H02M 3/33515; H02M 3/335; H02M 7/217; H02H 7/125

USPC ......... 363/21.11, 21.12, 21.13, 21.18, 26, 50, 363/56.03, 56.05–56.11; 323/282, 283, 323/285; 361/18
See application file for complete search history.

(56) References Cited

U.S. PATENT DOCUMENTS

| 2011/0194309 | A1* | 8/2011 | Gaknoki | ............. | H02M 1/4258 |
| | | | | | 363/21.01 |
| 2013/0141948 | A1* | 6/2013 | Bailey | ............... | H02M 3/33523 |
| | | | | | 363/21.16 |
| 2013/0182476 | A1* | 7/2013 | Yang | ....................... | H02M 7/48 |
| | | | | | 363/95 |
| 2014/0146581 | A1* | 5/2014 | Tsou | .................. | H02M 3/33507 |
| | | | | | 363/21.18 |
| 2015/0357924 | A1* | 12/2015 | Lin | .................... | H02M 3/33507 |
| | | | | | 363/21.18 |

* cited by examiner

*Primary Examiner* — Gary L Laxton
*Assistant Examiner* — Kyle J Moody
(74) *Attorney, Agent, or Firm* — Jianq Chyun IP Office

(57) ABSTRACT

A power conversion apparatus and an over power protection method thereof are provided. A number of times a sensing voltage exceeding a reference voltage is counted, so as to determine whether to disable a power switch in the power conversion apparatus according to the number of times the sensing voltage exceeding the reference voltage, in which the sensing voltage corresponds to a current flowing through the power switch on a resistor.

9 Claims, 3 Drawing Sheets

POWER CONVERSION APPARATUS AND OVER POWER PROTECTION METHOD THEREOF

CROSS-REFERENCE TO RELATED APPLICATION

This application claims the priority benefit of Taiwan application serial no. 103127080, filed on Aug. 7, 2014. The entirety of the above-mentioned patent application is hereby incorporated by reference herein and made a part of this specification.

BACKGROUND

1. Technical Field

The invention relates to an electronic apparatus, and particularly relates to a power conversion apparatus and an over power protection method thereof.

2. Related Art

In conventional technique, a main effect of a power conversion apparatus is to convert an alternating current (AC) input voltage with high voltage and low stability into a direct current (DC) output voltage low voltage and high stability that is suitable for the use of various electronic apparatuses. Therefore, the power conversion apparatus is widely used in electronic apparatuses such as computers, office automation equipment, industrial control equipment, and communication equipment, etc.

However, when an output terminal of the power conversion apparatus has a problem of open circuit or short circuit, the power conversion apparatus probably outputs an abnormal large current continuously, which may cause abnormal temperature increase of the power conversion apparatus or load internal components, and may increase a risk of damaging the power conversion apparatus or the load internal components.

SUMMARY

The invention is directed to a power conversion apparatus and an over power protection method, by which an effect over power protection is provided to avoid damaging the power conversion apparatus or an electronic apparatus using the power conversion apparatus due to excessive large voltage or current continuously output by the power conversion apparatus.

The invention provides a power conversion apparatus including a transformer, a power switch, a first resistor, a first comparison unit, a counting unit, a second comparison unit and a pulse width modulation (PWM) control unit. The transformer has a primary side and a secondary side, a first end of the primary side is configured to receive an input voltage, and the secondary side is configured to provide an output voltage to an electronic apparatus. A first terminal of the power switch is coupled to a second end of the primary side, a second terminal of the power switch is coupled to a first node, and a control terminal of the power switch receives a PWM signal. The first resistor is coupled between the first node and a ground voltage. The first comparison unit compares a voltage of a feedback signal related to a load status of the electronic apparatus with a first reference voltage to generate a first comparison signal. The counting unit is coupled to the first comparison unit to receive the first comparison signal, and when the voltage of the feedback signal is greater than the first reference voltage, the first comparison unit enables the counting unit. The second comparison unit is coupled to the first node and the counting unit, and compares a voltage of the first node with a second reference voltage to generate a second comparison signal, and the counting unit counts a number of times the voltage of the first node exceeding the second reference voltage according to the second comparison signal. The PWM control unit is coupled to the counting unit and the control terminal of the power switch, and stops generating the PWM signal used for switching the power switch when a counting value of the counting unit is greater than a predetermined value.

In an embodiment of the invention, when a voltage of the feedback signal is not greater than the first reference voltage, the first comparison unit resets the counting value of the counting unit.

In an embodiment of the invention, the power conversion apparatus further includes a feedback unit, and the feedback unit is coupled to the secondary side to receive the output voltage, and accordingly outputs the feedback signal.

In an embodiment of the invention, the power switch includes an N-type transistor.

The invention provides an over power protection method of a power conversion apparatus, which includes following steps. A pulse width modulation (PWM) signal is generated according to a load status of an electronic apparatus. A power switch in the power conversion apparatus is switched according to the PWM signal, such that the power conversion apparatus provides an output voltage to the electronic apparatus. It is determined whether a voltage of a feedback signal related to the load status of the electronic apparatus is greater than a first reference voltage. When the voltage of the feedback signal is greater than the first reference voltage, a number of times a detecting voltage exceeding a second reference voltage is counted, where the detecting voltage corresponds to a current flowing through the power switch on a resistor. It is determined whether the number of times the detecting voltage exceeding the second reference voltage is greater than a predetermined value. When the number of times the detecting voltage exceeding the second reference voltage is greater than the predetermined value, switching of the power switch is stopped.

In an embodiment of the invention, when the voltage of the feedback signal is not greater than the first reference voltage, the counted number of times the detecting voltage exceeding the second reference voltage is reset.

In an embodiment of the invention, the power switch includes an N-type transistor.

According to the above descriptions, whether the power switch is disabled is determined according to the number of times the detecting voltage exceeding the second reference voltage, so as to avoid damaging the power conversion apparatus or the electronic apparatus using the power conversion apparatus due to excessive large voltage or current continuously output by the power conversion apparatus, and provide an effective over power protection, where the detecting voltage corresponds to the current flowing through the power switch on a resistor.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
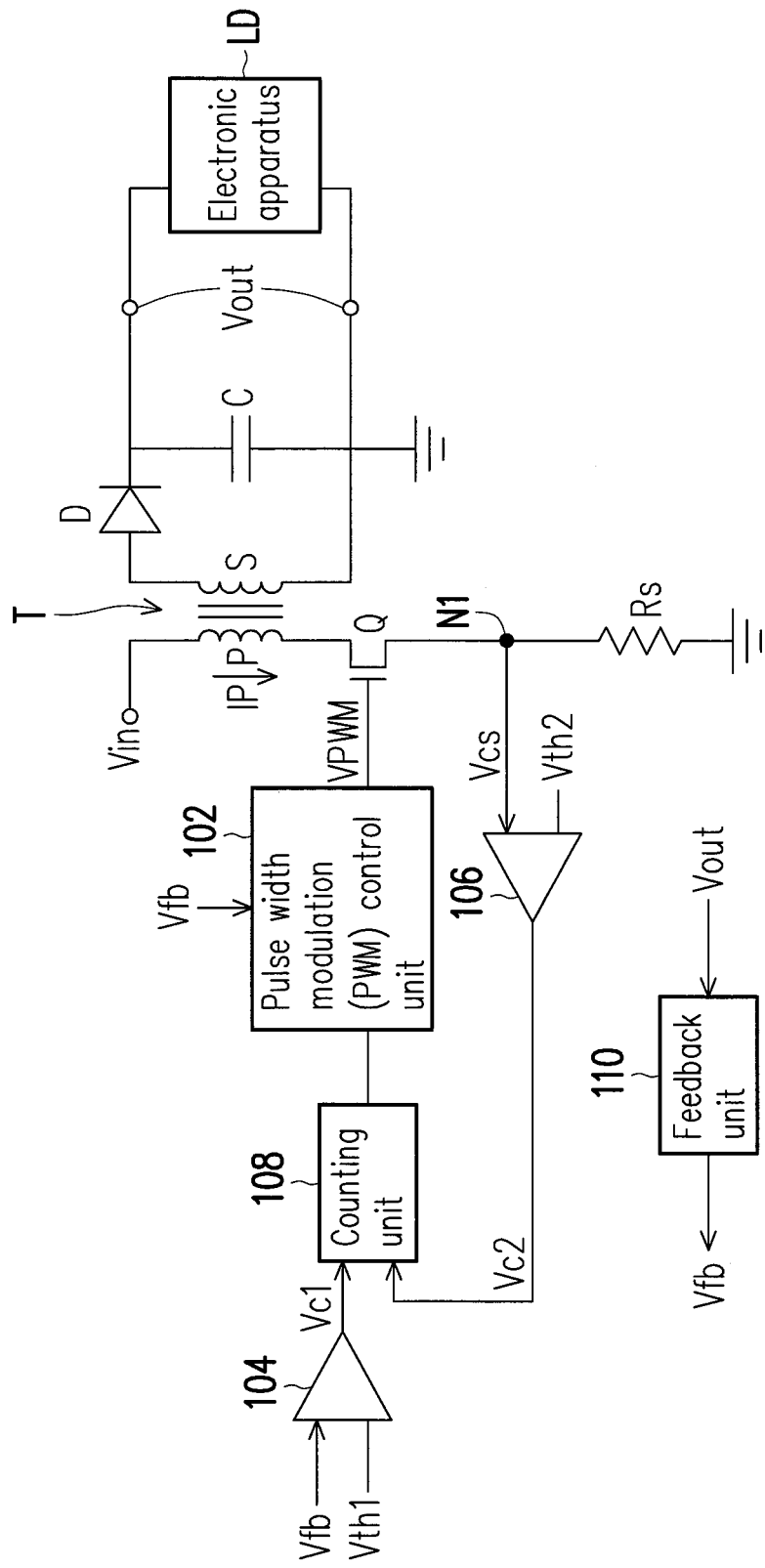
FIG. 1 is a schematic diagram of a power conversion apparatus according to an embodiment of the invention.

FIG. 1 is a schematic diagram of a power conversion apparatus according to an embodiment of the invention. Referring to FIG. 1, the power conversion apparatus includes a transformer T, a power switch Q, a resistor Rs, a pulse width modulation (PWM) control unit 102, a comparison unit 104, a comparison unit 106, a counting unit 108, a feedback unit 110, a diode D and a capacitor C. In the present embodiment, the transformer T has a primary side P and secondary side S, and a first end of the primary side P of the transformer T receives an input voltage Vin, and the secondary side S of the transformer T outputs an output voltage Vout to an electronic apparatus LD.

The input voltage Vin is a direct current (DC) input voltage generated by a rectifier by rectifying an alternating current (AC) input voltage, and the input voltage Vin received by the primary side P of the transformer T is transformed into a voltage of the secondary side S of the transformer T (which is determined by a turn ratio of the primary side P and the secondary side S of the transformer T), and is further rectified by the diode D and filtered by the capacitor C to form the DC output voltage Vout required during the operation of the electronic apparatus LD. An anode of the diode D is coupled to a first end of the secondary side S of the transformer T, and a cathode of the diode D is coupled to the electronic apparatus LD. Moreover, a first end of the capacitor C is coupled to the cathode of the diode D, and a second end of the capacitor C is coupled to a second end of the secondary side S of the transformer T and a ground voltage.

The feedback unit 110 is coupled to the secondary side S of the transformer T, and receives the DC output voltage Vout, and outputs a feedback signal Vfb related to a load status of the electronic apparatus LD. It should be noticed that any circuit capable of outputting the feedback signal related to the load status of the electronic apparatus LD can be used as the feedback unit 110 of the present embodiment, for example, a feedback circuit composed of a resistance voltage divider and an optical coupler, and implementation of the feedback unit 110 is not limited thereto. The PWM control unit 102 is coupled to a control terminal of the power switch Q and a node N1, and generates a PWM signal VPWM according to the feedback signal Vfb output by the feedback unit 110. A first terminal of the power switch Q (for example, an N-type transistor) is coupled to the second end of the primary side P of the transformer T, a second terminal of the power switch Q is coupled to the node N1, and the control terminal of the power switch Q receives the PWM signal VPWM. The resistor Rs is coupled between the node N1 and the ground voltage.

Figure 2:
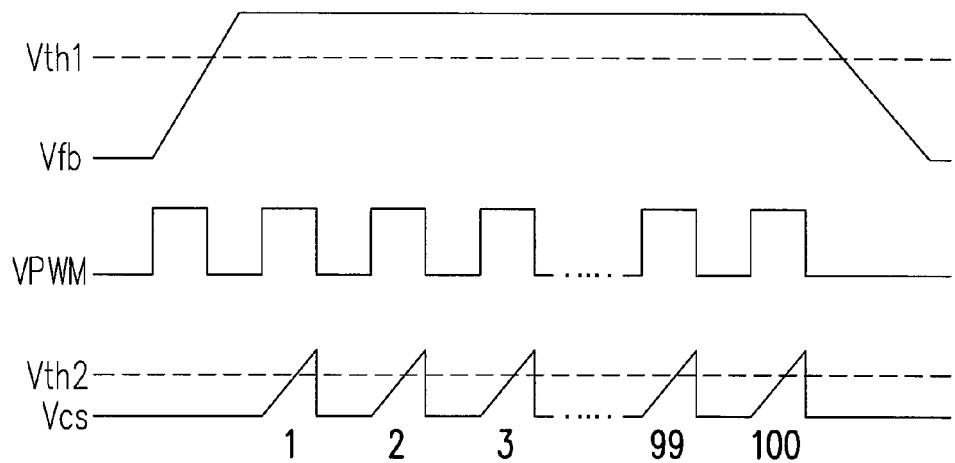
FIG. 2 is a waveform diagram of a feedback signal, a PWM signal and a voltage on a node N1 according to an embodiment of the invention.

The comparison unit 104 compares a voltage of the feedback signal Vfb with a reference voltage Vth1, and outputs a comparison signal Vc1 to the counting unit 108 according to a comparison result. When the voltage of the feedback signal Vfb is greater than the reference voltage Vth1, the counting unit 108 is enabled by the comparison unit 104, and when the voltage of the feedback signal Vfb is not greater than the reference voltage Vth1, a counting value of the counting unit 108 is reset by the comparison unit 104. Moreover, the comparison unit 106 compares a voltage Vcs on the node N1 with a reference voltage Vth2, and outputs a comparison signal Vc2 to the counting unit 108 according to a comparison result. After the counting unit 108 is enabled, the counting unit 108 starts to count a number of times the voltage Vcs exceeding the reference voltage Vth2, i.e. the number of times that the voltage Vcs is changed from a value smaller than the reference voltage Vth2 to a value greater than the reference voltage Vth2, and outputs the counting value to the PWM control unit 102, where a voltage value of the reference voltage Vth1 is greater than a voltage value of the reference voltage Vth2. When the counting value of the counting unit 108 is accumulated to exceed a predetermined value (shown in FIG. 2, and the predetermined value is 100 in the present embodiment), the PWM control unit 102 stops outputting the PWM signal VPWM to the power switch Q, i.e. stops switching the power switch Q to decrease a current Ip flowing through the primary side P of the transformer T, so as to avoid a situation that the power conversion apparatus continuously generates excessive voltage Vout to cause damage/burn of the power switch Q and/or the electronic apparatus LD.

Figure 3:
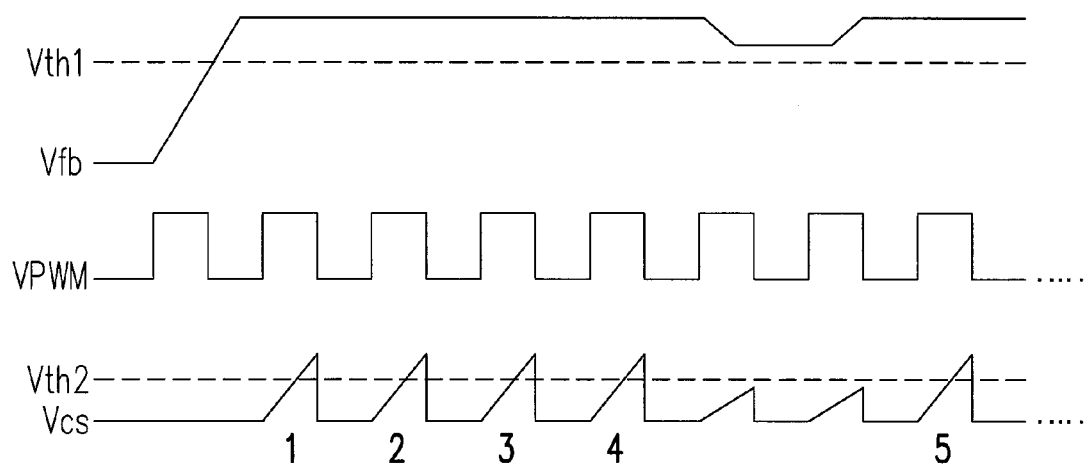
FIG. 3 is a waveform diagram of a feedback signal, a PWM signal and a voltage on a node N1 according to another embodiment of the invention.

In some embodiments, if the voltage of the feedback signal Vfb is decreased to be lower than the reference voltage Vth1 before the counting value of the counting unit 108 is accumulated to exceed the predetermined value, it represents that an output load of the power conversion apparatus has returned back to a normal range, and now the comparison unit 104 resets the counting value of the counting unit 108. Moreover, as shown in the embodiment of FIG. 3, due to an unstable state of the output voltage Vout, the voltage of the feedback signal Vfb can be slightly decreased but is still higher than the reference voltage Vth1, and now the voltage Vcs on the node N1 is probably lower than the reference voltage Vth2, and the counting value of the counting unit 108 is not increased. However, since the voltage of the feedback signal Vfb is not lower than the reference voltage Vth1, the counting value of the counting unit 108 is not reset, and after the state of the output voltage Vout becomes stable, the voltage Vcs on the node N1 starts to be higher than the reference voltage Vh2, and the counting value of the counting unit 108 also continues to accumulate.

After the output voltage Vout of the power conversion apparatus is pulled down, the voltage of the feedback signal Vfb generated according to the output voltage Vout is accordingly decreased, and when the voltage of the feedback signal Vfb is decreased to be lower than the reference voltage Vth1, the comparison unit 104 resets the counting value of the counting unit 108.

Figure 4:
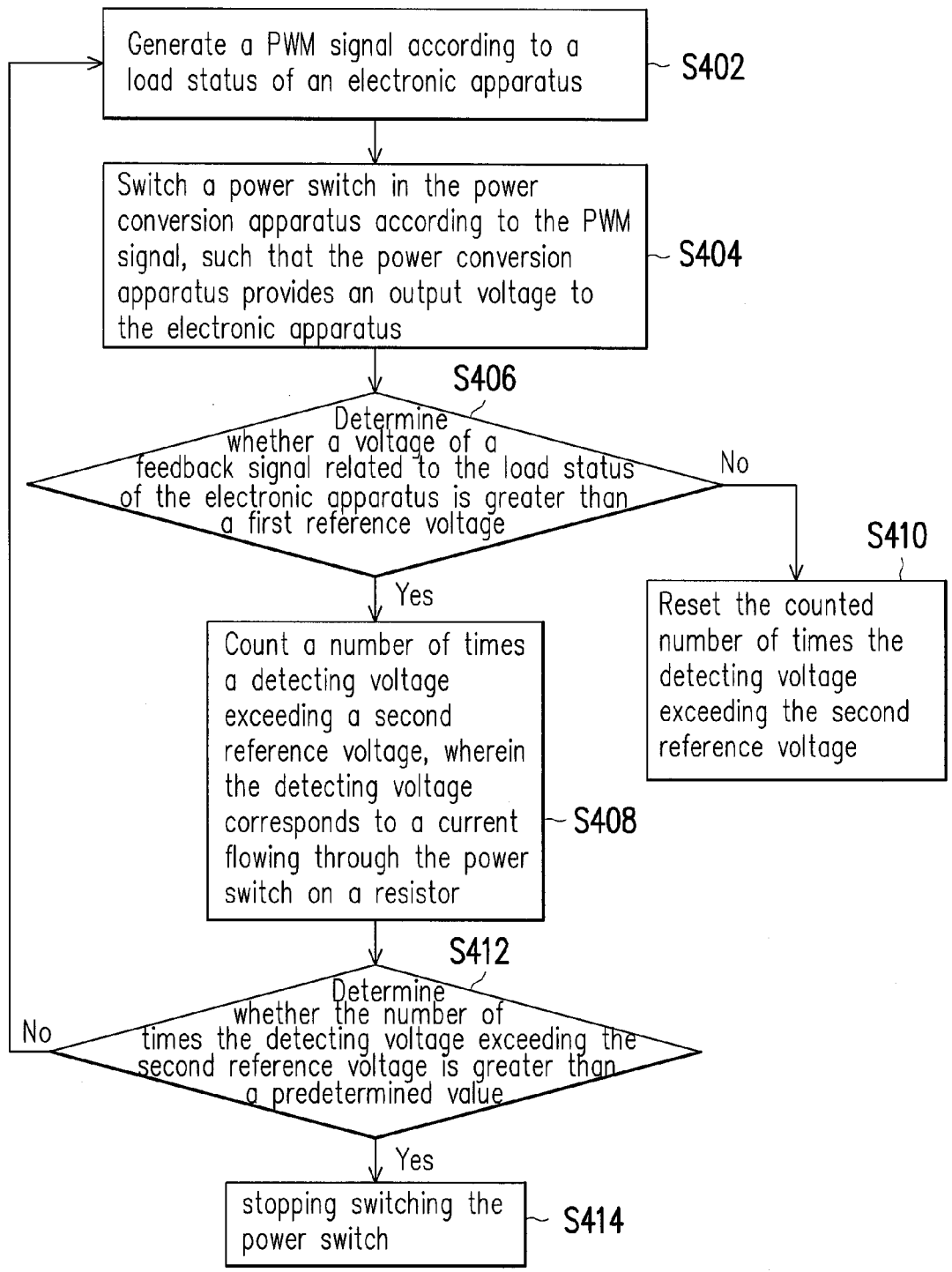
FIG. 4 is a flowchart illustrating an over power protection method of a power conversion apparatus according to an embodiment of the invention.

FIG. 4 is a flowchart illustrating an over power protection method of a power conversion apparatus according to an embodiment of the invention. Referring to FIG. 4, according to the aforementioned description of the power conversion apparatus, the over power protection method of the power conversion apparatus may include following steps. First, a PWM signal is generated according to a load status of an electronic apparatus (step S402). Then, a power switch in the power conversion apparatus is switched according to the PWM signal, such that the power conversion apparatus provides an output voltage to the electronic apparatus (step S404), where the power switch can be implemented by an N-type transistor. Then, it is determined whether a voltage of a feedback signal related to the load status of the electronic apparatus is greater than a first reference voltage (step S406). When the voltage of the feedback signal is greater than the first reference voltage, a number of times a detecting voltage exceeding the second reference voltage is counted, where the detecting voltage corresponds to a current flowing through the power switch on a resistor (step S408), where the first reference voltage is greater than the second reference voltage. Comparatively, when the voltage of the feedback signal is not greater than the first reference voltage, the number of times the detecting voltage exceeding the second reference voltage is reset (step S410). After the step 5408, it is determined whether the number of times the detecting voltage exceeding the second reference voltage is greater than a predetermined value (step S412). When the number of times the detecting voltage exceeding the second reference voltage is not greater than the predetermined value, the flow returns to the step S402, by which the PWM signal is generated according to the load status of the electronic apparatus. When the number of times the detecting voltage exceeding the second reference voltage is greater than the predetermined value, switching of the power switch is stopped (step S414).

In summary, whether the power switch is disabled is determined according to the number of times the detecting voltage exceeding the second reference voltage, so as to avoid damaging the power conversion apparatus or the electronic apparatus using the power conversion apparatus due to excessive large voltage or current continuously output by the power conversion apparatus, and provide an effective over power protection, where the detecting voltage corresponds to the current flowing through the power switch on a resistor.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A power conversion apparatus, comprising:
   a transformer, having a primary side and a secondary side, wherein a first end of the primary side is configured to receive an input voltage, and the secondary side is configured to provide an output voltage to an electronic apparatus;
   a power switch, having a first terminal coupled to a second end of the primary side, a second terminal coupled to a first node, and a control terminal receiving a pulse width modulation (PWM) signal;
   a first resistor, coupled between the first node and a ground voltage;
   a first comparison unit, comparing a voltage of a feedback signal related to a load status of the electronic apparatus with a first reference voltage to generate a first comparison signal;
   a counting unit, coupled to the first comparison unit to receive the first comparison signal, wherein when the voltage of the feedback signal is greater than the first reference voltage, the first comparison unit enables the counting unit;
   a second comparison unit, coupled to the first node and the counting unit, and comparing a voltage of the first node with a second reference voltage to generate a second comparison signal, wherein the counting unit counts a number of times the voltage of the first node exceeding the second reference voltage according to the second comparison signal; and
   a PWM control unit, coupled to the counting unit and the control terminal of the power switch, and stopping generating the PWM signal used for switching the power switch when a counting value of the counting unit is greater than a predetermined value.

2. The power conversion apparatus as claimed in claim 1, wherein when a voltage of the feedback signal is not greater than the first reference voltage, the first comparison unit resets the counting value of the counting unit.

3. The power conversion apparatus as claimed in claim 1, wherein the first reference voltage is greater than the second reference voltage.

4. The power conversion apparatus as claimed in claim 1, further comprising:
   a feedback unit, coupled to the secondary side to receive the output voltage, and accordingly outputting the feedback signal.

5. The power conversion apparatus as claimed in claim 1, wherein the power switch is an N-type transistor.

6. An over power protection method of a power conversion apparatus, comprising:
   generating a pulse width modulation (PWM) signal according to a load status of an electronic apparatus;
   switching a power switch in the power conversion apparatus according to the PWM signal, such that the power conversion apparatus provides an output voltage to the electronic apparatus;
   determining whether a voltage of a feedback signal related to the load status of the electronic apparatus is greater than a first reference voltage;
   counting a number of times a detecting voltage exceeding a second reference voltage when the voltage of the feedback signal is greater than the first reference voltage, wherein the detecting voltage corresponds to a current flowing through the power switch on a resistor;
   determining whether the number of times the detecting voltage exceeding the second reference voltage is greater than a predetermined value; and
   stopping switching the power switch when the number of times the detecting voltage exceeding the second reference voltage is greater than the predetermined value.

7. The over power protection method of the power conversion apparatus as claimed in claim 6, wherein when the voltage of the feedback signal is not greater than the first reference voltage, the counted number of times the detecting voltage exceeding the second reference voltage is reset.

8. The over power protection method of the power conversion apparatus as claimed in claim 6, wherein the first reference voltage is greater than the second reference voltage.

9. The over power protection method of the power conversion apparatus as claimed in claim 6, wherein the power switch is an N-type transistor.

* * * * *